United States Patent
Qaroush et al.

(10) Patent No.: US 10,543,576 B2
(45) Date of Patent: Jan. 28, 2020

(54) GLASS SUBSTRATE SUPPORT APPARATUSES AND METHODS OF PROVIDING FLEXIBLE GLASS SUBSTRATE SUPPORT

(71) Applicant: Corning Incorporated, Corning, NY (US)

(72) Inventors: Yousef Kayed Qaroush, Painted Post, NY (US); Shai Negev Shafrir, Rochester, NY (US)

(73) Assignee: Corning Incorporated, Corning, NY (US)

( * ) Notice: Subject to any disclaimer, the term of this patent is extended or adjusted under 35 U.S.C. 154(b) by 208 days.

(21) Appl. No.: 15/742,551

(22) PCT Filed: Jul. 6, 2016

(86) PCT No.: PCT/US2016/041026
§ 371 (c)(1),
(2) Date: Jan. 8, 2018

(87) PCT Pub. No.: WO2017/007782
PCT Pub. Date: Jan. 12, 2017

(65) Prior Publication Data
US 2018/0200858 A1 Jul. 19, 2018

Related U.S. Application Data

(60) Provisional application No. 62/190,027, filed on Jul. 8, 2015.

(51) Int. Cl.
B24B 9/10 (2006.01)
B65G 49/06 (2006.01)
B24B 41/06 (2012.01)

(52) U.S. Cl.
CPC ............ *B24B 9/102* (2013.01); *B24B 41/068* (2013.01); *B65G 49/065* (2013.01); *B65G 2201/022* (2013.01)

(58) Field of Classification Search
CPC ..... B24B 9/102; B24B 41/068; B65G 49/065; B65G 2201/022
USPC ......................................... 451/412, 388, 44
See application file for complete search history.

(56) References Cited

U.S. PATENT DOCUMENTS

| | | | | |
|---|---|---|---|---|
| 2,209,505 A | * | 7/1940 | Bole | ......................... B24B 7/24 |
| | | | | 451/412 |
| 2,267,605 A | * | 12/1941 | Drake | ................. C03B 33/0235 |
| | | | | 193/35 R |
| 3,338,696 A | | 8/1967 | Dockerty | |

(Continued)

*Primary Examiner* — George B Nguyen
(74) *Attorney, Agent, or Firm* — Kevin M. Able (57) ABSTRACT

A glass substrate support system includes a first and second vacuum members extending lengthwise in a glass substrate feed direction along opposing edges of a flexible glass substrate. Each vacuum member has a vacuum body including a pressure chamber located therein and a support surface having a vacuum opening extending therethrough and in communication with the pressure chamber. A support rod assembly is provided that includes a plurality of support rods located between the first second vacuum members in the glass substrate feed direction. The support rod assembly has an out-of-plane configuration that supports the flexible glass substrate in a downward arc orientation.

20 Claims, 8 Drawing Sheets (56) References Cited

U.S. PATENT DOCUMENTS

| | | | | |
|---|---|---|---|---|
| 3,437,469 | A | * | 4/1969 | Bourgeaux ............ B65G 49/065 65/25.2 |
| 3,682,609 | A | | 8/1972 | Dockerty |
| 3,908,318 | A | * | 9/1975 | Wallin .................. B23Q 1/0054 451/411 |
| 4,830,650 | A | | 5/1989 | Kelly |
| 5,409,417 | A | * | 4/1995 | Bando ........................ B24B 9/10 451/211 |
| 6,083,083 | A | * | 7/2000 | Nishimura ............... B24D 9/10 451/41 |
| 6,102,788 | A | * | 8/2000 | Uto ..................... H01L 21/6838 451/288 |
| 6,668,589 | B1 | | 12/2003 | Mizusugi et al. |
| 8,146,385 | B2 | * | 4/2012 | Delia .................. C03B 33/0215 225/4 |
| 2004/0226318 | A1 | | 11/2004 | Schwartz et al. |
| 2005/0009453 | A1 | * | 1/2005 | Lee .......................... B24B 37/30 451/41 |
| 2005/0044896 | A1 | | 3/2005 | Frank et al. |
| 2008/0276646 | A1 | | 11/2008 | Chalk et al. |
| 2012/0021679 | A1 | * | 1/2012 | Bando ..................... B24B 7/245 451/412 |
| 2014/0357160 | A1 | * | 12/2014 | Han ........................ B24B 49/12 451/6 |

\* cited by examiner

GLASS SUBSTRATE SUPPORT APPARATUSES AND METHODS OF PROVIDING FLEXIBLE GLASS SUBSTRATE SUPPORT

This application claims the benefit of priority under 35 U.S.C. § 119 of U.S. Provisional Application Ser. No. 62/190,027, filed on Jul. 8, 2015, the content of which is relied upon and incorporated herein by reference in its entirety.

BACKGROUND

Field

The present disclosure relates to processing glass substrates and, more particularly, to glass substrate support apparatuses and methods of supporting flexible glass substrates.

Technical Background

Conventional glass edge finishing apparatuses have been developed largely for relatively thick glass substrates having relatively high stiffness compared to thinner glass substrates. As one example, glass sheets, after having been formed using a mechanical scoring and breaking process, typically have edges that are ground using a metal grinding wheel. In certain applications, for example in the automotive industry, it may be desirable to provide the edges of the glass sheets with a rounded profile on the outer periphery of the glass sheets.

Flat panel displays and other applications often use much thinner glass sheets than are employed in the automotive industry. Thinner glass sheets can have a reduced stiffness and increased flexibility compared to the thicker glass sheets. Edge finishing such thin glass sheets having reduced stiffness and increased flexibility can introduce challenges due, at least in part, to the forces involved in the edge finishing process. Accordingly, there is need for methods and apparatuses for supporting relatively thin glass substrates during glass substrate processing and edge finishing.

SUMMARY

One technique to improve the mechanical reliability of flexible glass substrates is to ground and polish edges of the flexible glass substrates to remove undesirable cracks and fractures in the flexible glass layer, for example, in order to achieve a predetermined edge strength. During the beveling process, abrasive wheels may be used to shape the glass edge to a desired shape while the flexible glass substrate is overhanging a support surface that is located beneath the flexible glass substrate. The amount of glass material exposed to the beveling process can be determined based on the production equipment and can range from 5 mm to 30 mm.

When processing or conveying ultra-thin glass of thicknesses less than 0.3 mm, the glass stiffness is relatively low which can result in glass buckling under its own weight between the support surfaces. Further, during edge beveling processes, particularly those at less than vertical, a coolant may be applied to the abrasive wheel and glass edge interface and those fluids, as well as from other process coolant sources, may accumulate on the flexible glass substrate during conveyance in the grinding stage area. The accumulation of fluid can result in localized sagging of the flexible glass substrate, which can lead to further deformations of the flexible glass substrate due to bending moments. Glass support apparatuses and methods are described herein that can allow finishing or otherwise supporting of flexible glass substrates while decreasing bending moments in the flexible glass substrates, which can reduce glass tensile stresses due to bending and reduce glass edge susceptibility to breakage, for example, during a beveling process.

According to one embodiment, a glass substrate support system includes first and second vacuum members extending lengthwise in a glass substrate feed direction. Each vacuum member includes a vacuum body including a pressure chamber located therein and a support surface comprising a vacuum opening extending therethrough and in communication with each respective pressure chamber. A support rod assembly includes a plurality of support rods located between the first and second vacuum members and extending in the glass substrate feed direction. The support rod assembly includes an out-of-plane configuration that supports the flexible glass substrate in a downward arc orientation.

According to another embodiment, a glass edge finishing apparatus includes a glass substrate transport system and a glass substrate support system moveable by the glass substrate transport system in a glass substrate feed direction. The glass substrate support system is configured to support a flexible glass substrate including a generally planar surface and an out-of-plane direction normal to the generally planar surface. The glass substrate support system includes a vacuum member extending lengthwise along an edge of the flexible glass substrate in the glass substrate feed direction. The vacuum member includes a vacuum body including a pressure chamber located therein and a support surface comprising a vacuum opening extending therethrough and in communication with the pressure chamber. A support rod assembly is adjacent the vacuum member and includes a plurality of elongated support rods extending in the glass substrate feed direction. The support rod assembly includes an out-of-plane configuration that supports the flexible glass substrate in a downward arc orientation.

According to yet another embodiment, a method of supporting a flexible glass substrate includes positioning a flexible glass substrate on a glass support system that includes first and second vacuum members extending lengthwise in a glass substrate feed direction and along opposing edges of a flexible glass substrate. Each vacuum member includes a vacuum body including a pressure chamber located therein and a support surface including a vacuum opening extending therethrough and in communication with the respective pressure chamber. A support rod assembly includes a plurality of elongated support rods extending in the glass substrate feed direction and located between the first and second vacuum members. The support rod assembly is moved from a planar configuration to an out-of-plane configuration that supports the flexible glass substrate in a downward arc orientation.

Additional features and advantages described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Although glass is an inherently strong material, its strength and mechanical reliability are a function of its surface defect or flaw size density distribution and the cumulative exposure of the material to stress over time. Edge strength can be an important factor for mechanical reliability of flexible glass substrates. During an entire product life cycle, flexible glass substrates may be subjected to various kinds of static and dynamic mechanical stresses. Embodiments described herein generally relate to glass support apparatuses and methods that can allow finishing or otherwise supporting of flexible glass substrates while decreasing bending moments in the flexible glass substrates.

Flexible glass substrates that are trimmed from glass ribbon tend to have sharp edges formed during trimming operations. The sharp edges of the flexible glass substrates are prone to damage during handling. Edge flaws, for example chips, cracks, and the like, may decrease the strength of the glass. The edges of the flexible glass substrates may be processed to remove the sharp edges by grinding and shaping, for example beveling, to eliminate sharp edges that are easily damaged. By removing the sharp edges from the flexible glass substrates, flaws in the flexible glass substrate may be minimized, thereby reducing the likelihood of damage to the glass plate during handling.

Figure 16:
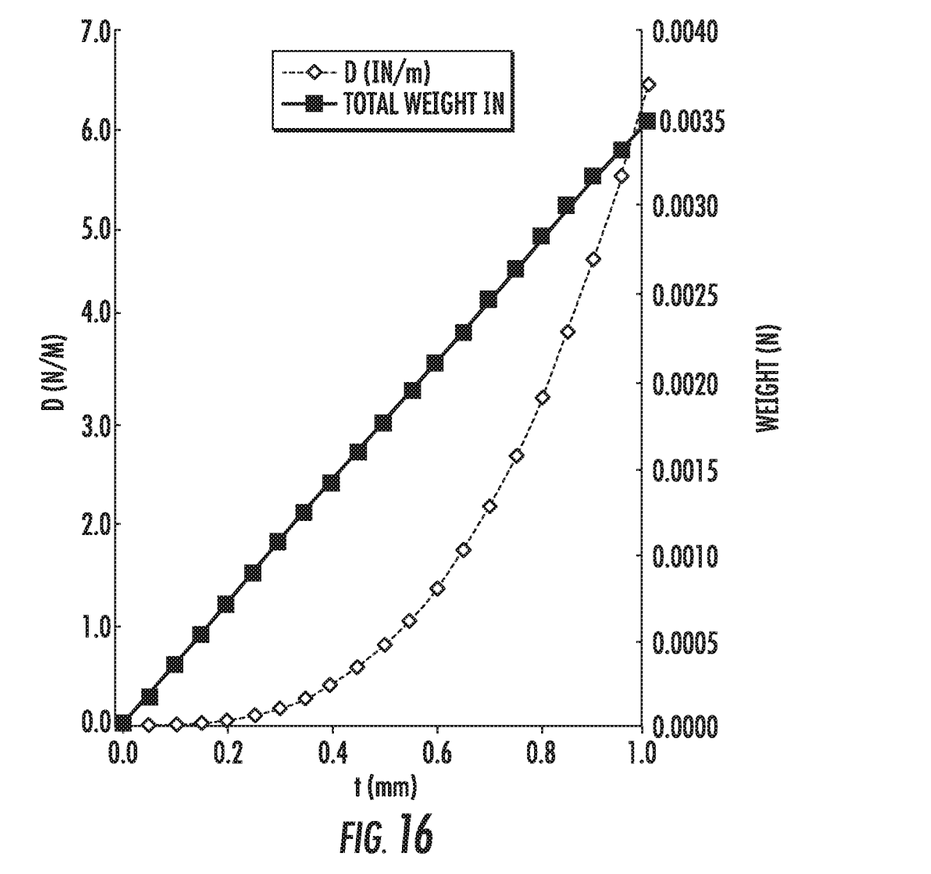
FIG. 16 a plot illustrating flexural rigidity of a flexible glass substrate versus thickness of the flexible glass substrate in accordance with aspects of the disclosure.

In a horizontal glass edge finishing process, the flexible glass substrate is positioned generally in a horizontal plane or at some angle less than vertical having a horizontal component. As a result, the flexible glass substrate may be supported at multiple locations across its width, in a cross-feed direction. Generally, the flexible glass substrate has opposite planar surfaces and an out-of-plane direction normal to the generally planar surface. A glass substrate feed direction is normal to the out-of-plane direction, parallel to the glass edge being finished and the cross-feed direction is transverse to the feed direction and glass edge being machined. Due to the pristine nature of the quality areas of the flexible glass substrate between the edges, reduced contact area with support structures can be desired. Thus, multiple support structures spaced-apart across the width of the flexible glass substrate may be used. Depending on the size and spacing of the support structures, the flexible glass substrate may experience sag in unsupported regions of the flexible glass substrate between the support structures. As illustrated by FIG. 16, for example, the flexural rigidity (D) (a free overhanging edge of 15 mm of the flexible glass substrate) tends to remain relatively low for flexible glass substrate thicknesses less than about 0.6 mm, becoming relatively flat and low at about 0.25 mm or less. The glass stiffness can be represented by the flexural rigidity (D), which is a function of the Young's modulus (E), thickness (t) and Poisson's ratio ($\upsilon$) and is given by:

$$D = \frac{Et^3}{12(1-v^2)}.$$

This sag can be enhanced where a coolant fluid accumulates on the horizontally positioned flexible glass substrate, thereby increasing the overall weight of the flexible glass substrate.

Figure 1:
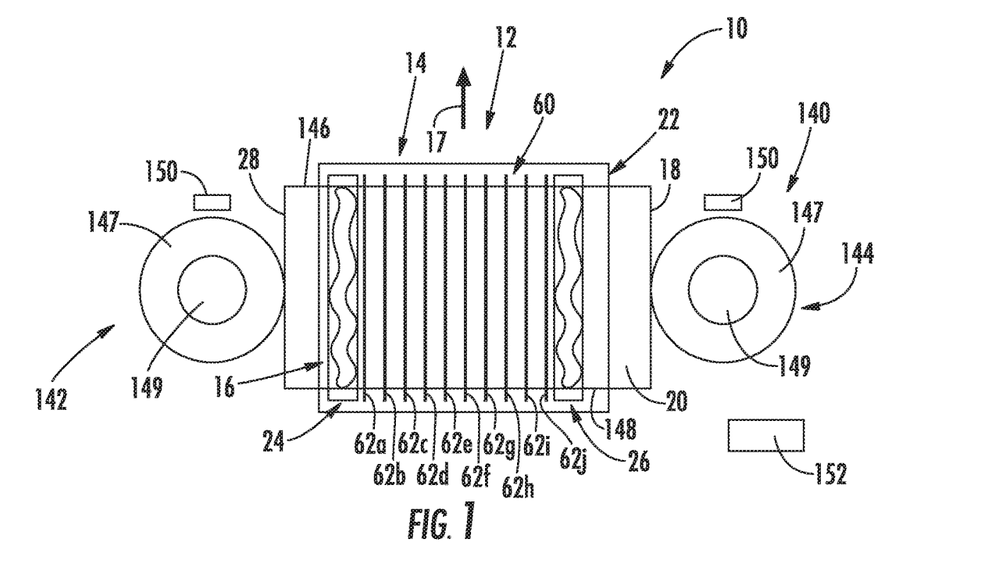
FIG. 1 is a schematic illustration of a glass finishing apparatus in accordance with aspects of the disclosure.

Referring to FIG. 1, a glass edge finishing apparatus 10 suitable for performing a beveling process includes a support device 12 including a glass substrate transport system 14 and a glass substrate support system 16. The glass substrate transport system 14 can move (e.g., translate) the glass substrate support system 16 in the glass substrate feed direction 17, which can be generally aligned with an edge 18 of a flexible glass substrate 20. The glass substrate support system 16 may be carried with or otherwise moved by the glass substrate transport system 14 in the feed direction 17. The glass substrate support system 16 includes a vacuum system 22 that includes edge vacuum members 24 and 26, for example, vacuum chucks, that extend along opposite edges 18 and 28 of the flexible glass substrate 20 and, in some embodiments, along substantially the entire length or even more than the entire length of the flexible glass substrate 20 in the glass substrate feed direction 17. In some embodiments, the edge vacuum members 24 and 26 may be formed of a single, elongated vacuum member. In other embodiments, multiple vacuum members may be used and, for example, aligned side-by-side in the feed direction 17. While only edge vacuum members 24 and 26 are illustrated, inboard vacuum members may also be utilized.

Figure 2:
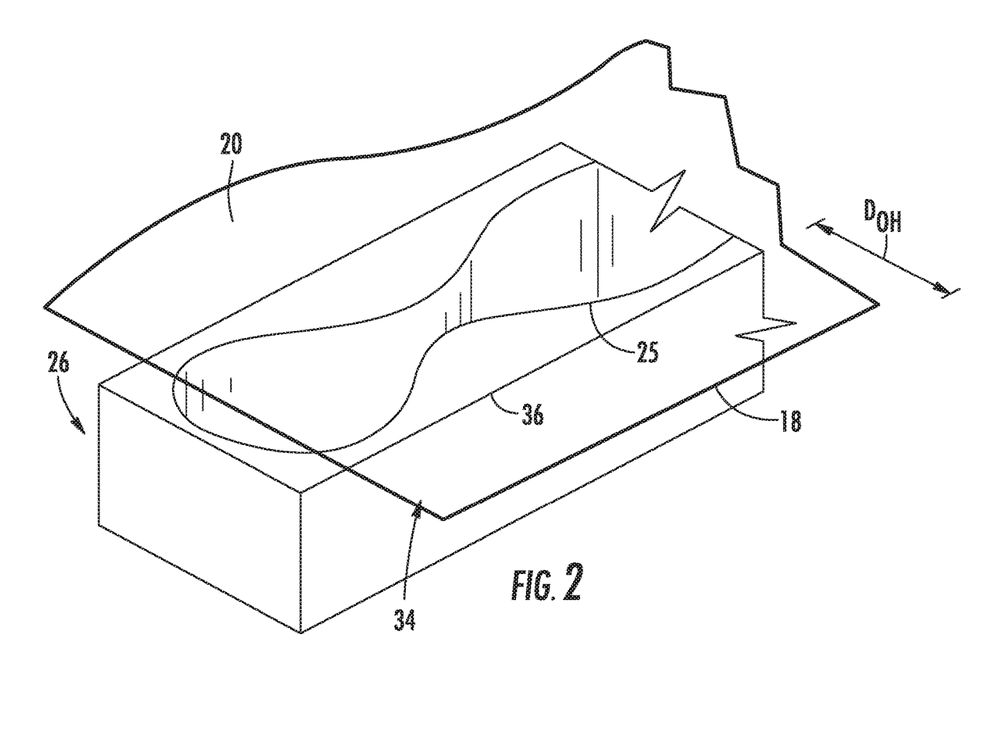
FIG. 2 is a detail view of a vacuum member and flexible glass substrate for use in the finishing apparatus of FIG. 3 in accordance with aspects of the disclosure.

FIG. 2 illustrates a detail view of the edge vacuum member 26 and flexible glass substrate 20. The edge vacuum member 26 can apply a sufficient vacuum suction force to inhibit movement (horizontal and vertical) of the edge 18 of the flexible glass substrate 20 during a beveling process. As used herein, "vacuum suction force" refers to the cumulative area of the vacuum openings 25 of the edge vacuum member 26 multiplied by the suction pressure. As can be seen, the vacuum suction force can be applied by the edge vacuum member 26 near to or spaced from the edge 18 of the flexible glass substrate 20. This location of the edge vacuum member 26 forms an overhang region 34 of the flexible glass substrate 20 having an overhang distance $D_{OH}$ measured from an outer edge 36 of the edge vacuum member 26 where the overhang begins to the edge 18 in a direction perpendicular to the edge 18 (or feed direction 17). In some embodiments, the overhang distance $D_{OH}$ may be no less than about 6 mm, such as no less than about 10 mm, such as no less than about 15 mm, such as no less than about 20 mm. In some embodiments, the overhang distance $D_{OH}$ may be between about 5 mm and about 30 mm.

Figure 3:
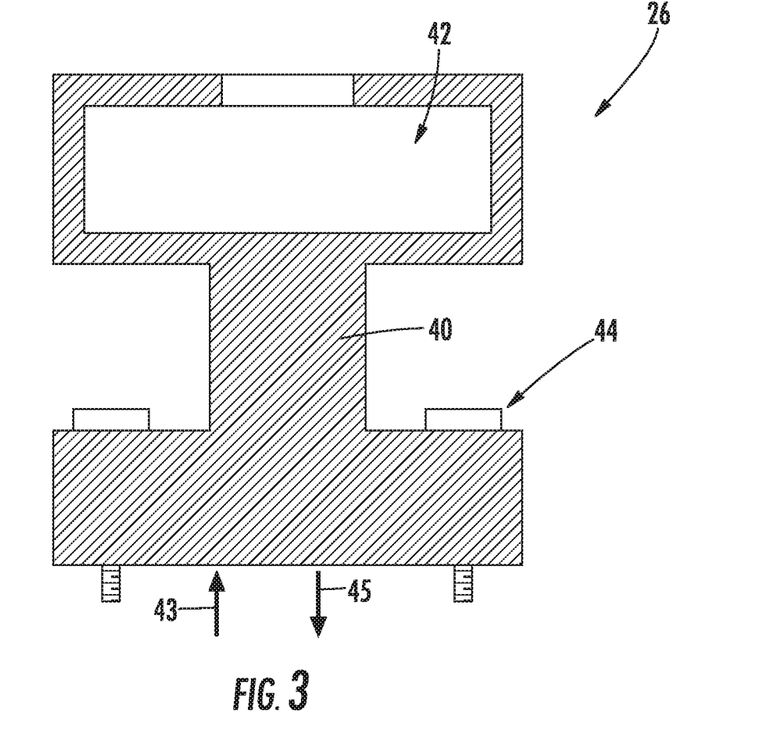
FIG. 3 is a section view of a vacuum member in accordance with aspects of the disclosure.
Figure 4:
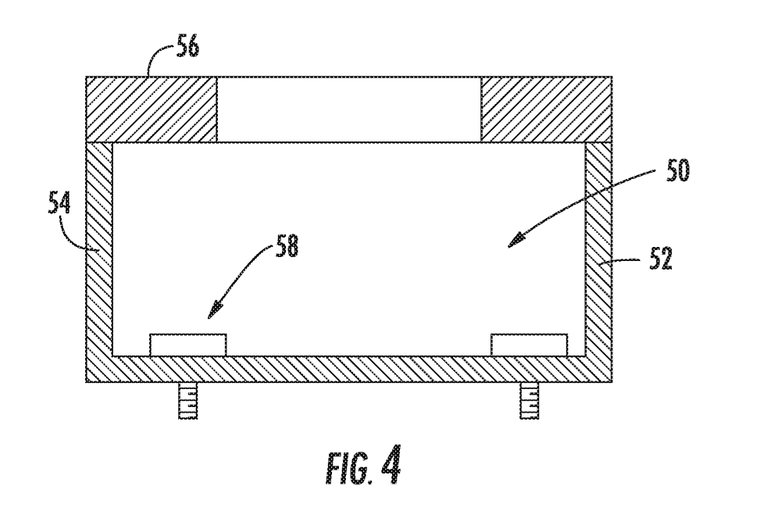
FIG. 4 is a section view of another vacuum member in accordance with aspects of the disclosure.

The edge vacuum member may be a single-piece or multi-piece configuration. Referring to FIG. 3, for example, the edge vacuum member 26 may have a vacuum body 40 having a single-piece monolithic configuration. The vacuum body 40 may include a pressure chamber 42 provided therein and a connect arrangement 44 that is formed as part of the vacuum body 40, separate from the pressure chamber 42, that allows the edge vacuum member 26 to be connected to a glass transport system. Inlet 43 and outlet 45 may supply positive and/or negative pressure to the pressure chamber 42. FIG. 4 illustrates a multi-piece configuration where a vacuum member 50 includes a vacuum body 52 formed by a chamber housing member 54 and a cap member 56. A connect arrangement 58 may be provided for connecting the vacuum member 50 to a glass transport system.

Referring back to FIG. 1, as will be described in greater detail below, the glass substrate support system 16 further includes a support rod assembly 60 located between the edge vacuum members 24 and 26. The support rod assembly 60 includes a plurality of support rods 62a-62j having elongated lengths oriented in the feed direction 17 that are substantially parallel to one another (and the edge vacuum members 24 and 26). The support rods 62a-62j are also arranged spaced-apart from each other in the cross-feed direction and along the width of the flexible glass substrate 20 providing localized linear support regions extending along the length of the flexible glass substrate 20. In the illustrated embodiment, there are 10 support rods 62a-62j; however, in other embodiments there may be more or less than 10 support rods 62a-62j, depending, at least in part, on the size and thickness of the flexible glass substrate 20 and the distance between the edge vacuum members 24 and 26.

Figure 5:
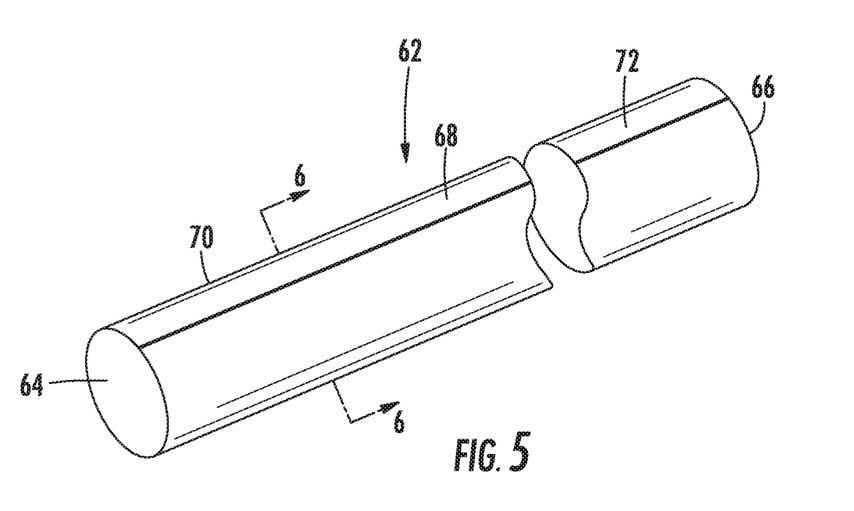
FIG. 5 is a perspective view of a support rod in accordance with aspects of the disclosure.
Figure 6:
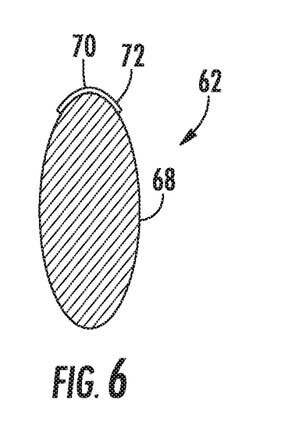
FIG. 6 is a section view of the support rod along line 6-6 of FIG. 5 in accordance with aspects of the disclosure.

Referring to FIGS. 5 and 6, a single support rod 62 is shown in isolation and includes opposite ends 64 and 66 and an elongated support body 68 that extends between the opposite ends 64 and 66. Referring particularly to FIG. 6, the elongated support body 68 may be solid as shown, or may be hollow (i.e., tubular) or at least partially hollow, but of suitable strength to support the flexible glass substrate 20 with minimal deflection. The support rod 62 may be of any suitable shape; however, reduced contact area with the flexible glass substrate 20 may be desired. In the illustrated embodiment, the support rod 62 is oval in shape having an upper contact surface 70 that can be arranged to face the flexible glass substrate 20. As can be seen, the upper contact surface 70 has a width that is less than a minor diameter (or maximum width) of the elongated support body 68. In some embodiments, the contact surface 70 may be formed by a compliant member 72, such as a pad or coating of a compliant material (e.g., silicone, rubber, foam, composite material) suitable to contact the flexible glass substrate 20 without damage thereto. Other suitable cross-sectional shapes may include rectangular, circular, tiangular, etc. Further, while the contact surface 70 is illustrated as continuous, the contact surface may be intermittent (e.g., there may be multiple, aligned support rods or intermittent contact surfaces on a single support rod). Any suitable materials may be used to form the support rods 62, such as metals, plastics or combinations of materials, coatings, etc. (e.g., polyvinyl chloride, foam, silicone, rubber, etc.).

Figure 7:
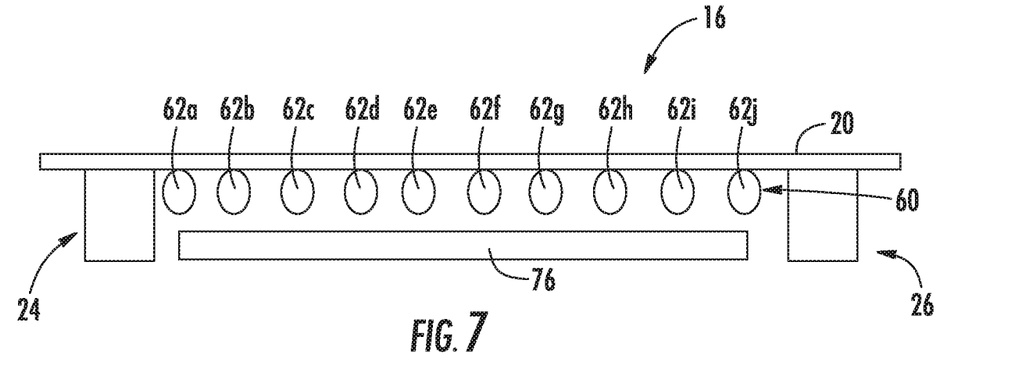
FIG. 7 illustrates operation of a glass substrate support system of the glass finishing apparatus of FIG. 1 in a planar configuration in accordance with aspects of the disclosure.
Figure 8:
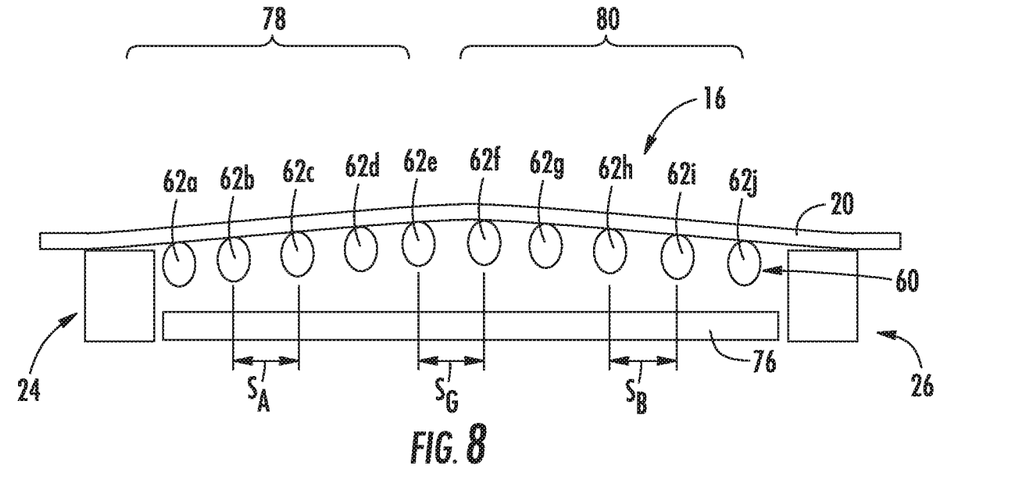
FIG. 8 illustrates operation of the glass substrate support system of FIG. 7 in an out-of-plane configuration in accordance with aspects of the disclosure.

Referring now to FIGS. 7 and 8, operation of the glass substrate support system 16 including support rod assembly 60 will now be described. Referring first to FIG. 7, the support rod assembly 60 is shown in a planar configuration with all of the support rods 62a-62j being substantially aligned in a horizontal plane to allow the flexible glass substrate to lie substantially on a horizontal plane defined by the contact surfaces of each support rod 62a-62j. In this configuration, positive pressure may be supplied to the flexible glass substrate 20 using edge vacuum members 24 and 26 to allow at least portions of the flexible glass substrate 20 to float on a cushion of pressurized gas, which can facilitate positioning of the flexible glass substrate 20 on the glass substrate support system 16. Once positioned in a predetermined position, an actuator system 76 may move at least some or all of the support rods 62a-62j from the planar configuration to an out-of-plane configuration where the actuator system 76 moves at least some of the support rods 62a-62j from their original positions in the planar configuration to positions that define the out-of-plane configuration.

FIG. 8 illustrates the support rods 62a-62j moved into the out-of-plane configuration using the actuator system 76. In the illustrated example, the support rods 62a-62j may be provided in a plurality of groups that may be separately controllable. For example, FIG. 8 illustrates a first group 78 including support rods 62a-62e and a second group 80 including support rods 62f-62j. In first group 78, the support rods 62a-62e increase in elevation from support rod 62a to 62e with support rod 62e being the highest elevation (or moving the farthest vertically from the planar configuration). Similarly, in second group 80, the support rods 62f-62j increase in elevation from the support rod 62j to 62f with support rod 62f being the highest elevation (or moving the farthest vertically from the planar configuration). In some embodiments, the support rods 62a-62e of first group 78 may all be spaced substantially equidistant from each other in the cross-feed direction and the support rods 62f-62j may be spaced equidistant from each other in the cross-feed direction. In some embodiments, the spacing $S_A$ between adjacent support rods 62a-62e of first group 78 may be substantially the same as the spacing $S_B$ between adjacent support rods 62f-62j of second group 80. However, the spacing $S_G$ between the first and second groups 78 and 80 (i.e., between rod 62e and 62f may be the same or different than the spacing within the first and second groups 78 and 80. For example, the spacing $S_G$ may be greater than spacing $S_A$ and/or $S_B$. In other embodiments, the spacing $S_G$ may be less than the spacing $S_A$ and/or $S_B$. Once the support rods 62a-62j are placed in the out-of-plane configuration a negative pressure may be applied to the flexible glass substrate 20 through the edge vacuum members 24 and 26 and the flexible glass substrate 20 is presented in a slightly curved, downward arc configuration, which can facilitate runoff of liquid and particulates that may accumulate on the glass surface. As used herein, "downward arc" refers to a general shape of a curve where line segments joining two points of the curve do not lie above the curve. It should be apparent from the present disclosure that more than two groups of support rods may be provided.

Figure 9:
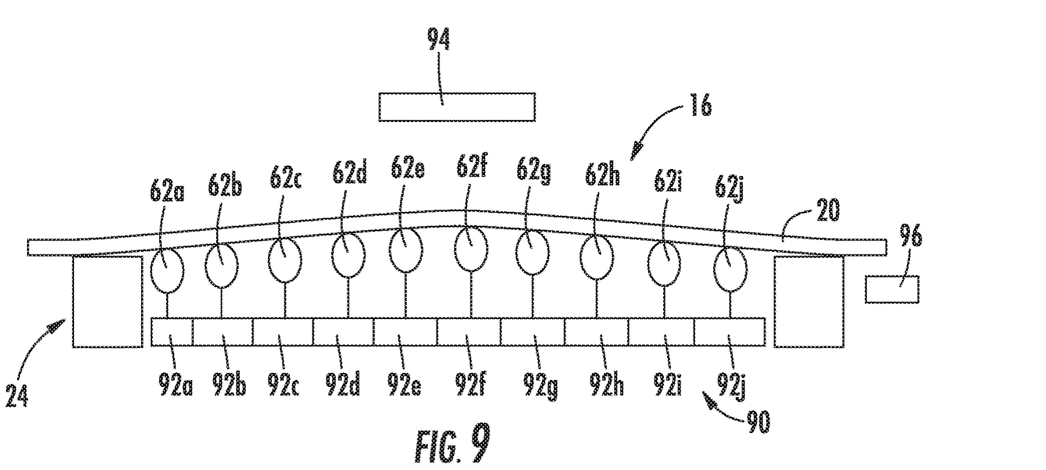
FIG. 9 illustrates a schematic view of another glass substrate support system having an actuator system in accordance with aspects of the disclosure.
Figure 10:
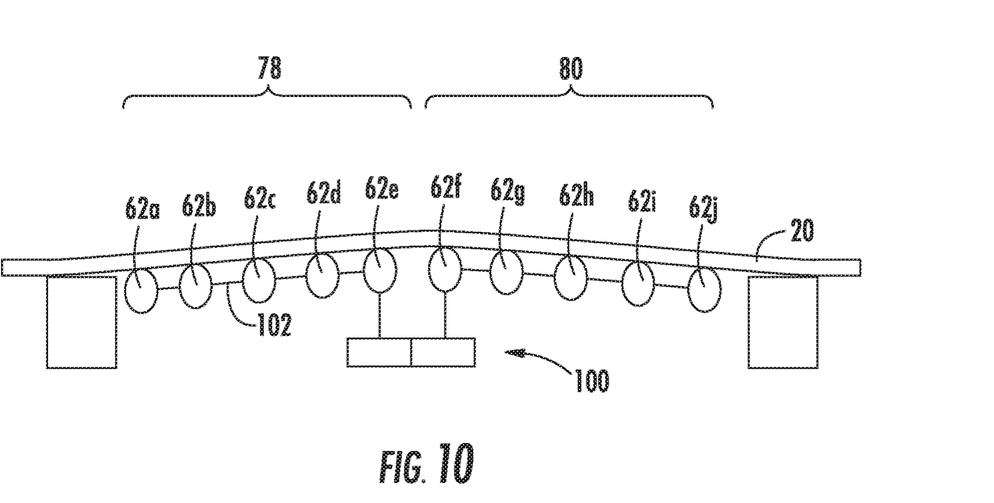
FIG. 10 illustrates a schematic view of a glass substrate support system having another actuator system in accordance with aspects of the disclosure.
Figure 11:
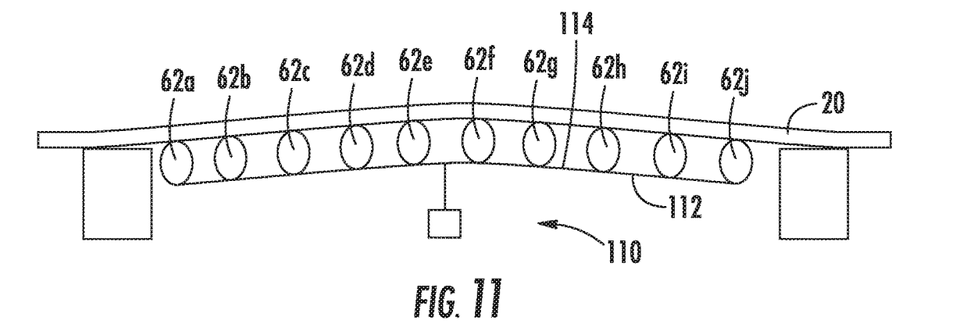
FIG. 11 illustrates a schematic view of a glass substrate support system having another actuator system in accordance with aspects of the disclosure.
Figure 12:
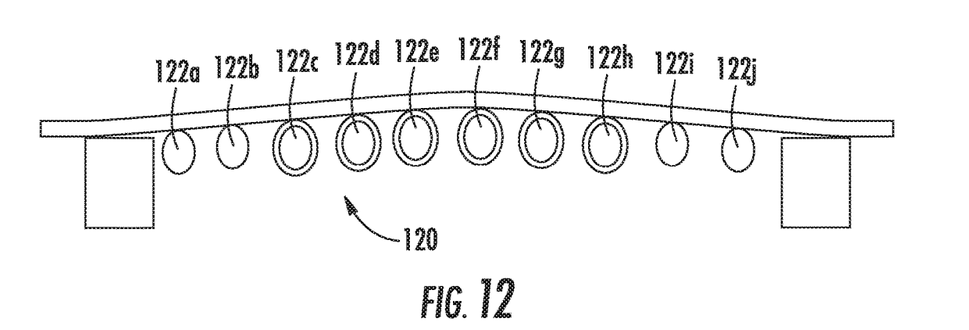
FIG. 12 illustrates a schematic view of a glass substrate support system having another actuator system in accordance with aspects of the disclosure.

Referring to FIGS. 9-12, a variety of exemplary actuator systems and method are illustrated. Referring to FIG. 9, an actuator system 90 may include individual actuators 92a-92j that each individually move a respective one of the support rods 62a-62j. The actuator system 90 may be of a positive stop configuration where each actuator 92a-92j stops in the out-of-plane configuration automatically. In another embodiment, a controller 94 may individually control the stopping point or distance traveled of each actuator 92a-92j, for example, based on a user input and/or logic saved in a memory location of controller 94. For example, a sensor system 96 including one or more sensors (e.g., proximity sensors) may provide a signal to the controller 94 once a predetermined distance is reached. FIG. 10 illustrates an alternative embodiment of an actuator system 100 where individual support rods 62a-62j are linked together by linkages 102, either across first and second groups 78 and 80 or only within first and second groups 78 and 80. In this embodiment, multiple support rods 62a-62j can be moved by only moving one or some of the support rods 62a-62j directly using the actuator system 100. FIG. 11 illustrates another alternative embodiment of an actuator system 110 where a rod lifting member 112 of a suitable shape or support edge 114 profile is used to move multiple of the support rods 62a-62j to the out-of-plane configuration. Referring to FIG. 12, another embodiment of an actuator system 120 includes inflatable or otherwise dynamic support rods 122a-122j (e.g., using a memory shape material) that can change shape to place the flexible glass substrate 20 in the out-of-plane configuration in response to an input (e.g., air, electricity, heat, etc.).

Figure 13:
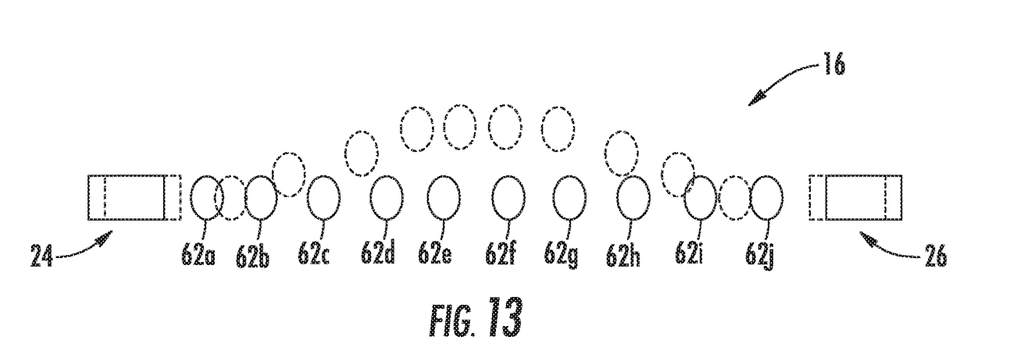
FIG. 13 illustrates a schematic view of a glass substrate support system having in-plane or horizontal movement in accordance with aspects of the disclosure.

Referring to FIG. 13, while vertical or out-of-plane movement of the support rods 62a-62j is described above, in-plane or horizontal movement of the support rods 62a-62j and edge vacuum members 24 and 26 is also contemplated. For example, the solid lines of FIG. 13 illustrate the glass substrate support system 16 in the retracted, planar configuration and the dashed lines illustrate the glass substrate support system 16 in the extended, out-of-plane configuration. In this example, as the support rods 62a-62j are lifted vertically as described above, the glass substrate support system 16 contracts, the actuator system 76 moving the edge vacuum members 24 and 26 toward each other and reducing spacing $S_A$, $S_B$ and/or $S_G$. Such an arrangement can facilitate movement of the flexible glass substrate 20 into the out-of-plane configuration without moving the edges relative to the edge vacuum members 24 and 26 due to the decrease in horizontal footprint width of the flexible glass substrate 20 in the out-of-plane configuration relative to the planar configuration.

Referring back to FIG. 1, once the flexible glass substrate 20 is supported by the glass substrate support system 16, the flexible glass substrate 20 and the glass substrate support system 16 can be translated to an edge grinding system 140 of the glass edge finishing apparatus 10 by the glass substrate transport system 14. The edge grinding system 140 may generally include abrasive wheel assemblies 142 and 144 that are located at the opposite edges 18 and 28 of the flexible glass substrate 20. In other embodiments, only a single abrasive wheel assembly may be used, or there may be up to four abrasive wheel assemblies or one for each edge 18, 28, 146 and 148 of the flexible glass substrate 20.

The abrasive wheel assemblies 142 and 144 may each include an abrasive wheel 147 that is used to grind and shape the edges 18 and 28 of the flexible glass substrate 20 and a motor 149 that is used to rotate the abrasive wheel 147. In some embodiments, the abrasive wheel assemblies 142 and 144 may each further include drive mechanisms 150 that can be used to move the abrasive wheels 147 toward and away from the respective edges 18 and 28. A controller 152 may be provided that controls operation of the abrasive wheel assemblies 142 and 144, glass substrate support system 16 and glass substrate transport system 14. In the illustrated embodiment, the abrasive wheels 147 are formed wheels.

Figure 14:
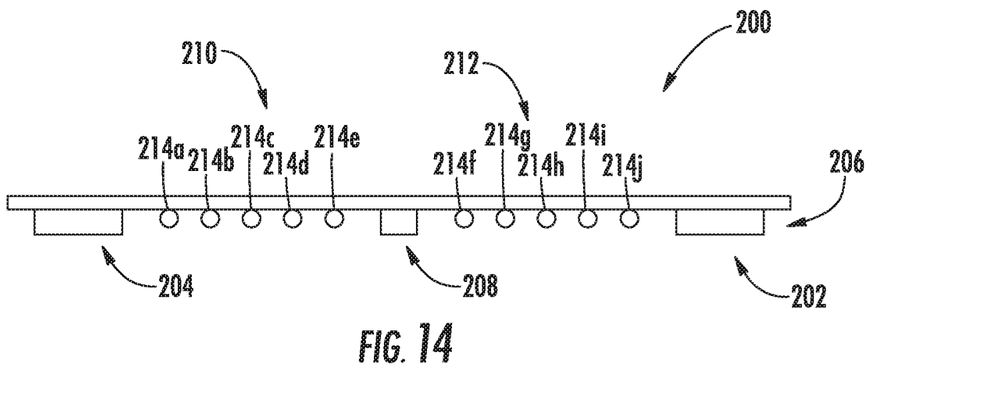
FIG. 14 illustrates another embodiment of a glass substrate support system in a planar configuration in accordance with aspects of the disclosure.
Figure 15:
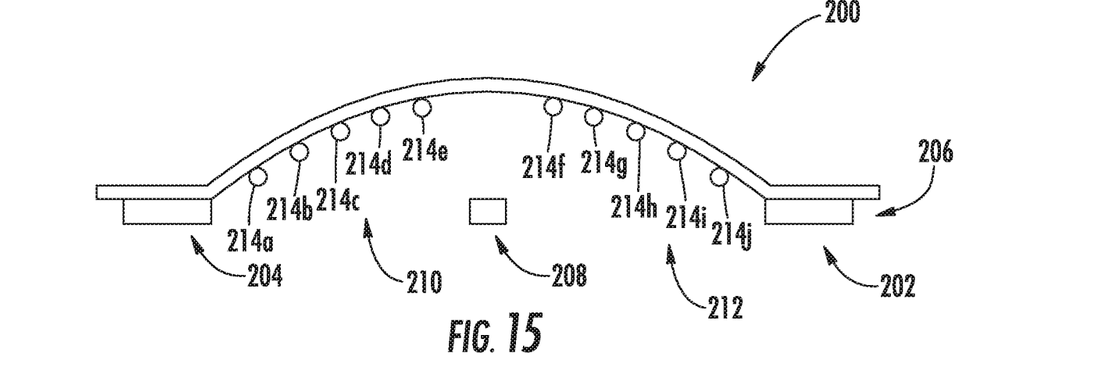
FIG. 15 illustrates the glass substrate support system of FIG. 16 in an out-of-plane configuration in accordance with aspects of the disclosure.

Referring to FIGS. 14 and 15, as indicated above, a glass substrate support system 200 may include a vacuum system 202 that includes both edge vacuum members 204 and 206 and one or more inboard vacuum member 208 located between the edge vacuum members 204 and 206. The inboard vacuum member 208 may, for example, also be located between groups 210 and 212 of support rods 214a-214j, which may move between planar and out-of-plane configurations as described above. The inboard vacuum member 208 may provide additional stabilization and facilitate movement of the flexible glass substrate with the support rods 214a-214j in the planar configuration.

A variety of abrasive wheels may be used to grind and shape the edges of flexible glass substrates, including use of "cup" wheels and "formed" wheels. Cup wheels are generally circular in shape and include a recessed center region spaced apart from the circumference of the cup wheel. The cup wheel is brought into contact with the flexible glass substrates where the planar faces of the cup wheel contact the flexible glass substrates while the circumferential faces of the cup wheel are spaced apart from the flexible glass substrates. Formed wheels include a groove positioned in an edge of the circumferential faces of the formed wheel. The groove includes a profile that corresponds to the processed shape of the substrate edge. The groove of the formed wheel is brought into contact with the edges of the flexible glass substrates to grind and shape the edges.

The flexible glass substrate 20 may have a thickness of about 0.3 mm or less including but not limited to thicknesses of, for example, about 0.01-0.05 mm, about 0.05-0.1 mm, about 0.1-0.15 mm, about 0.15-0.3 mm, about 0.100 to about 0.200 mm, 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm. The flexible glass substrate 20 may be formed of glass, a glass ceramic, a ceramic material or composites thereof. A fusion process (e.g., downdraw process) that forms high quality flexible glass substrates can be used in a variety of devices and one such application is flat panel displays. Flexible glass substrates produced in a fusion process have surfaces with superior flatness and smoothness when compared to flexible glass substrates produced by other methods. The fusion process is described in U.S. Pat. Nos. 3,338,696 and 3,682,609. Other suitable flexible glass substrate forming methods include a float, updraw and slot draw methods.

The above-described glass support systems and methods can control or limit the amount of out-of-plane deformation of a horizontal flexible glass substrate through use of multiple support rods that are positioned along the width of the flexible glass substrate in the cross-feed direction and that provide localized support lines that limit the out-of-plane deformation. The support rods can also be moved from a retracted, planar configuration that presents the flexible glass substrate in a horizontal orientation to an extended, out-of-plane configuration that presents the flexible glass substrate in a concave downward orientation, while continuing to control local deformations of the flexible glass substrate between adjacent support rods. The concave downward orientation of the flexible glass substrate can also facilitate runoff of coolant fluid and particles that may build up on the broad surface of the flexible glass substrate. The reduced contact area between the flexible glass substrate and the support rods can reduce flaw generation, which can maintain strength of the flexible glass substrate. The length and width dimensions of the support rods can be changed by substituting support rods of a different size to accommodate a variety of flexible glass substrate sizes.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass substrate support system, comprising:
   first and second vacuum members extending lengthwise in a glass substrate feed direction, each vacuum member comprising a vacuum body including a pressure chamber located therein and a support surface comprising a vacuum opening extending therethrough and in communication with the respective pressure chamber; and
   a support rod assembly comprising a plurality of support rods located between the first and second vacuum members and extending in the feed direction.

2. The glass support system of claim 1, wherein the plurality of support rods comprises a first group comprising at least 5 support rods.

3. The glass support system of claim 2, wherein each support rod of the first group is spaced equidistant from an adjacent support rod of the first group.

4. The glass support system of claim 2, wherein the plurality of support rods comprises a second group comprising at least 5 support rods.

5. The glass support system of claim 4, wherein the each support rod of the second group is spaced equidistant from an adjacent support rod of the second group.

6. The glass support system of claim 4, wherein the support rod assembly comprises a planar configuration that supports the flexible glass substrate in a substantially planar orientation.

7. The glass support system of claim 6, wherein the support rod assembly comprises an out-of-plane configuration that supports a flexible glass substrate in a downward arc orientation.

8. The glass support system of claim 7, further comprising an actuator system that moves the support rod assembly between the planar configuration and the out-of-plane configuration.

9. A glass edge finishing apparatus comprising:
   a glass substrate transport system;
   a glass substrate support system moveable by the glass substrate transport system in a glass substrate feed direction, the glass substrate support system configured to support a flexible glass substrate comprising a generally planar surface and an out-of-plane direction normal to the generally planar surface, the glass substrate support system comprising:
   a vacuum member extending lengthwise along an edge of the flexible glass substrate in the glass substrate feed direction, the vacuum member comprising a vacuum body including a pressure chamber located therein and a support surface comprising a vacuum opening extending therethrough and in communication with the pressure chamber; and
   a support rod assembly adjacent the vacuum member and comprising a plurality of elongated support rods extending in the glass substrate feed direction, the support rod assembly comprising an out-of-plane configuration that supports the flexible glass substrate in a downward arc orientation.

10. The glass edge finishing apparatus of claim 9, wherein the plurality of support rods comprises a first group comprising at least 5 support rods.

11. The glass edge finishing apparatus of claim 10, wherein each support rod of the first group is spaced equidistant from an adjacent support rod of the first group.

12. The glass edge finishing apparatus of claim 9, wherein the plurality of support rods comprises a second group comprising at least 5 support rods.

13. The glass edge finishing apparatus of claim 12, wherein each support rod of the second group is spaced equidistant from an adjacent support rod of the second group.

14. The glass edge finishing apparatus of claim 12, wherein the support rod assembly comprises a planar configuration that supports the flexible glass substrate in a substantially planar orientation.

15. The glass edge finishing apparatus of claim 14, further comprising an actuator system that moves the support rod assembly between the planar configuration and the out-of-plane configuration.

16. A method of supporting a flexible glass substrate, the method comprising:
   positioning a flexible glass substrate on a glass support system comprising:
      first and second vacuum members extending lengthwise in a glass substrate feed direction and along opposing edges of a flexible glass substrate, each vacuum member comprising a vacuum body including a pressure chamber located therein and a support surface including a vacuum opening extending therethrough and in communication with each respective pressure chamber; and
      a support rod assembly comprising a plurality of elongated support rods extending in the glass substrate feed direction and located between the first and second vacuum members; and
   moving the support rod assembly from a planar configuration to an out-of-plane configuration that supports the flexible glass substrate in a downward arc orientation.

17. The method of claim 16, wherein the step of positioning the flexible glass substrate on the glass support system comprises positioning the flexible glass substrate on the glass support system with the support rod assembly in the planar configuration.

18. The method of claim 16, further comprising applying a positive pressure to the flexible glass substrate using the first and second vacuum members during the step of positioning the flexible glass substrate on the glass support system.

19. The method of claim 16, further comprising, with the flexible glass substrate in the downward arc orientation, applying a negative pressure to the flexible glass substrate through the first and second vacuum members.

20. The method of claim 16, wherein the step of moving the support rod assembly from the planar configuration to the out-of-plane configuration is performed using an actuator system.

* * * * *

UNITED STATES PATENT AND TRADEMARK OFFICE
CERTIFICATE OF CORRECTION

PATENT NO. : 10,543,576 B2
APPLICATION NO. : 15/742551
DATED : January 28, 2020
INVENTOR(S) : Yousef Kayed Qaroush et al.

Page 1 of 1

It is certified that error appears in the above-identified patent and that said Letters Patent is hereby corrected as shown below:

On the Title Page

In Column 2, item (57), Abstract, Line 9, after "first" insert -- and --.

Signed and Sealed this
Thirty-first Day of March, 2020

Andrei Iancu
*Director of the United States Patent and Trademark Office*